United States Patent
Pelletier

(10) Patent No.: US 12,523,092 B2
(45) Date of Patent: Jan. 13, 2026

(54) ATTIC HATCH SYSTEMS WITH HANGER PARTS FOR SUPPORTING AN ATTIC HATCH, AND RELATED METHODS

(71) Applicant: Air-Lok Technologies Inc., Edmonton (CA)

(72) Inventor: Jordan Pelletier, Sturgeon County (CA)

(73) Assignee: AIR-LOK TECHNOLOGIES INC., Edmonton (CA)

( * ) Notice: Subject to any disclaimer, the term of this patent is extended or adjusted under 35 U.S.C. 154(b) by 226 days.

(21) Appl. No.: 18/120,645

(22) Filed: Mar. 13, 2023

(65) Prior Publication Data

US 2023/0287732 A1  Sep. 14, 2023

(51) Int. Cl.
*E06B 5/01* (2006.01)

(52) U.S. Cl.
CPC .................................. *E06B 5/01* (2013.01)

(58) Field of Classification Search
CPC ........... E06B 5/01; E04B 9/003; E04F 11/062
See application file for complete search history.

(56) References Cited

U.S. PATENT DOCUMENTS

| | | |
|---|---|---|
| 2,793,688 A | 5/1957 | Robey |
| 3,364,639 A | 1/1968 | Davenport |
| 3,566,564 A | 3/1971 | Gaeth |
| 3,896,595 A | 7/1975 | Anghinetti et al. |
| 4,151,894 A | 5/1979 | Edwards |
| 4,179,144 A * | 12/1979 | Henderson ............ E05B 65/006 292/202 |
| 4,299,059 A | 11/1981 | Smith |
| 4,312,423 A | 1/1982 | Helbig |
| 4,344,505 A | 8/1982 | Waters |
| 4,443,973 A * | 4/1984 | Naka ....................... E04B 9/003 49/400 |
| 4,483,102 A | 11/1984 | Edwards |
| 4,563,845 A | 1/1986 | Stipe |
| 4,658,555 A | 4/1987 | Steiner |
| 4,738,054 A * | 4/1988 | Muth ....................... E04F 19/08 49/386 |
| 4,928,441 A | 5/1990 | Daley |
| 5,161,329 A | 11/1992 | Brown |

(Continued)

FOREIGN PATENT DOCUMENTS

| | | |
|---|---|---|
| AT | 347658 | 1/1979 |
| CA | 2887732 | 10/2016 |

(Continued)

*Primary Examiner* — Gisele D Ford
(74) *Attorney, Agent, or Firm* — Robert A. Nissen

(57) ABSTRACT

An attic hatch system for mounting within an attic access conduit defined by a ceiling, has an attic hatch structured to mount within the attic access conduit, the attic hatch comprising an insulative hatch body; one or more hanger parts structured to support the attic hatch within the attic access conduit in use, with each of the one or more hanger parts comprising: a top flange member extended laterally outward from the insulative hatch body to extend over and secure on a top shoulder of a structural member of the ceiling in use; a skirt structured to depend from the top flange member through the attic access conduit in use; and a base flange member extended laterally inward from the skirt to define a seat that supports a base surface of the attic hatch.

21 Claims, 10 Drawing Sheets

(56) References Cited

U.S. PATENT DOCUMENTS

| | | | |
|---|---|---|---|
| 5,239,795 A | 8/1993 | Breaux | |
| 5,274,966 A | 1/1994 | Daley | |
| 5,481,833 A | 1/1996 | Williams | |
| 5,623,795 A | 4/1997 | Padgett | |
| 5,628,151 A | 5/1997 | Monat | |
| 5,867,946 A | 2/1999 | Seagren | |
| 6,014,841 A | 1/2000 | McCoy | |
| 6,223,490 B1 | 5/2001 | Wessley | |
| 6,578,327 B1 | 6/2003 | Hackbarth | |
| 6,615,544 B1* | 9/2003 | Tlemcani | E05F 1/006 49/7 |
| 6,701,676 B1 | 3/2004 | Kompelien | |
| 7,337,584 B2* | 3/2008 | Viens | E04F 11/06 52/207 |
| 7,650,722 B1 | 1/2010 | Melesky | |
| 7,836,638 B2 | 11/2010 | Ogieglo | |
| 8,590,229 B2 | 11/2013 | Taylor | |
| 8,931,215 B1 | 1/2015 | Cook et al. | |
| 9,249,614 B1 | 2/2016 | Mucciolo | |
| 9,631,407 B2* | 4/2017 | Wise | E05D 7/12 |
| 9,783,981 B2 | 10/2017 | Rinne | |
| 9,869,123 B2* | 1/2018 | Arthur | E06C 9/08 |
| 10,285,514 B2* | 5/2019 | Iellimo | B65G 1/02 |
| 10,570,615 B2* | 2/2020 | Richmond | E04B 1/80 |
| 10,829,985 B2* | 11/2020 | Jejina | E06B 5/04 |
| 2002/0112409 A1 | 8/2002 | Knowles | |
| 2003/0182869 A1* | 10/2003 | Jejina | E06B 5/01 52/309.9 |
| 2005/0183354 A1* | 8/2005 | Tlemcani | E06B 5/01 52/232 |
| 2006/0005495 A1* | 1/2006 | Stessel | E04B 9/24 52/506.07 |
| 2006/0258284 A1* | 11/2006 | Melesky | E04B 9/003 454/349 |
| 2007/0017178 A1 | 1/2007 | Jejina | |
| 2007/0193136 A1 | 8/2007 | Olsen | |
| 2009/0133342 A1 | 5/2009 | Copeland | |
| 2009/0241434 A1 | 10/2009 | McCoy | |
| 2009/0277099 A1* | 11/2009 | Ogieglo | E06B 5/01 52/745.15 |
| 2010/0107510 A1 | 5/2010 | Copeland | |
| 2011/0138713 A1 | 6/2011 | Reed | |
| 2011/0265392 A1 | 11/2011 | Uhl | |
| 2012/0036805 A1 | 2/2012 | Tobbe | |
| 2012/0186179 A1* | 7/2012 | Melesky | E04B 9/001 52/404.4 |
| 2012/0328807 A1 | 12/2012 | Grimes | |
| 2013/0232880 A1 | 9/2013 | Cook | |
| 2015/0101272 A1 | 4/2015 | Richmond | |
| 2016/0145863 A1* | 5/2016 | Bergman | E04B 9/26 52/698 |
| 2017/0292318 A1 | 10/2017 | Arthur | |
| 2017/0362885 A1 | 12/2017 | Jejina | |
| 2018/0038155 A1 | 2/2018 | Melesky | |
| 2018/0106037 A1 | 4/2018 | Greenburg | |
| 2018/0320375 A1 | 11/2018 | Richmond | |

FOREIGN PATENT DOCUMENTS

| | | |
|---|---|---|
| CA | 2947548 | 10/2017 |
| CN | 112360311 | 2/2021 |
| DE | 102008040434 | 1/2010 |
| DE | 202011107719 | 1/2012 |
| EP | 3040492 | 7/2016 |
| FR | 2966491 | 4/2012 |
| GB | 2470058 A | 11/2010 |
| IE | 20030816 | 3/2005 |
| IT | 20120079 A1 | 1/2014 |
| JP | 2005090064 | 4/2005 |

* cited by examiner

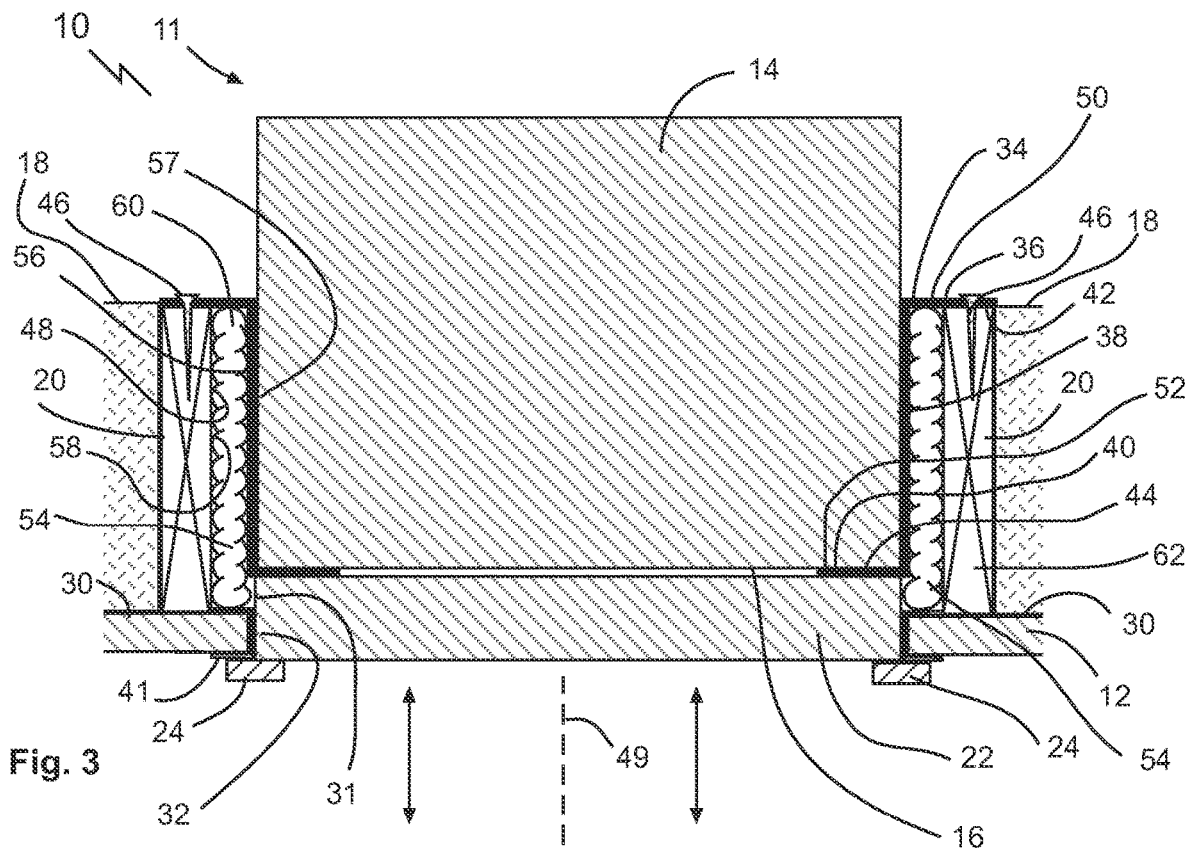
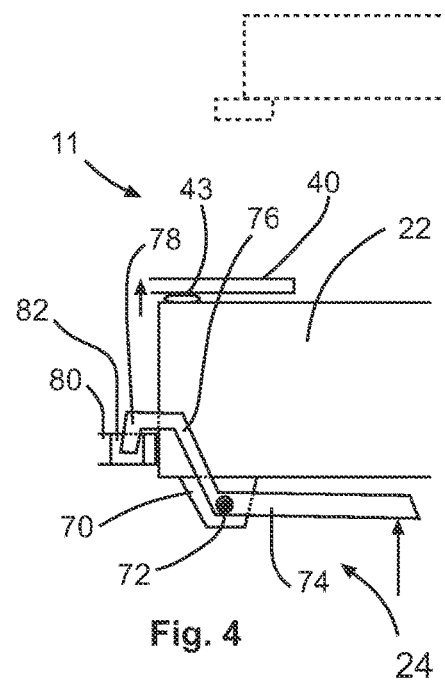
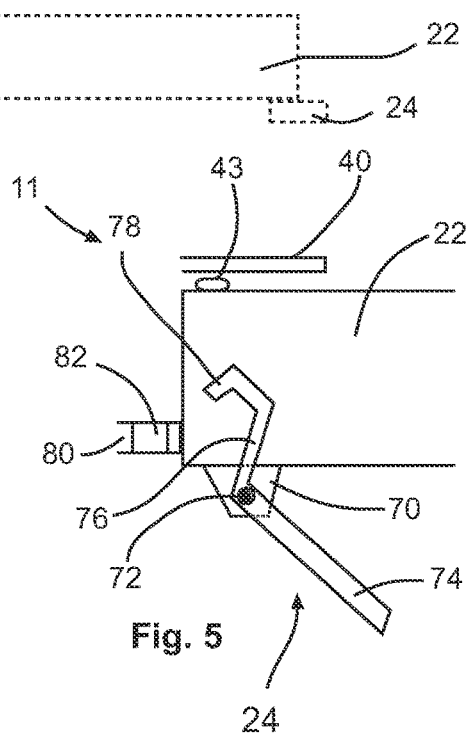

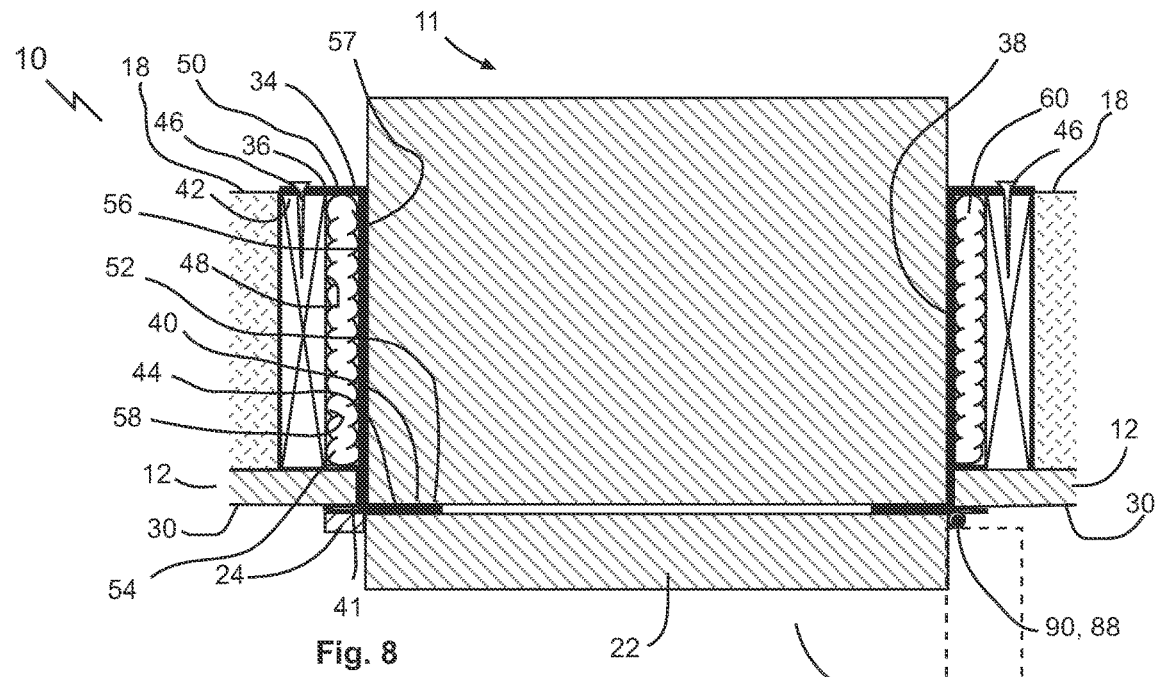
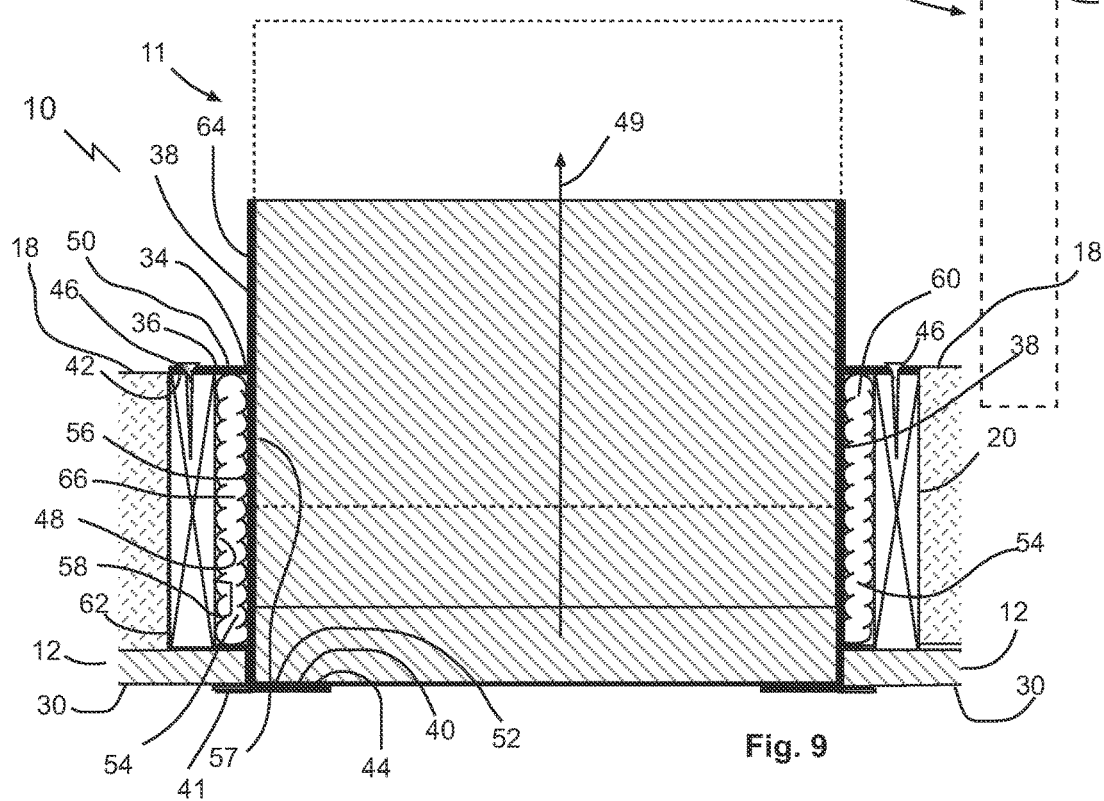

ATTIC HATCH SYSTEMS WITH HANGER PARTS FOR SUPPORTING AN ATTIC HATCH, AND RELATED METHODS

TECHNICAL FIELD

This document relates to attic hatch systems with hanger parts for supporting an attic hatch, and related methods.

BACKGROUND

The following paragraphs are not an admission that anything discussed in them is prior art or part of the knowledge of persons skilled in the art.

Conventional attic hatches will typically involve a hatch panel that rests upon a peripheral flange made of boards that are fastened about a base periphery of the attic access conduit in a ceiling. The hatch panel will usually support a layer of insulative material, such as fiberglass or Mineral wool foam, above the hatch panel. To enter the attic, a user pushes the attic hatch and insulative material upward until the attic access conduit is open for attic entry.

SUMMARY

An attic hatch system is disclosed for mounting within an attic access conduit defined by a ceiling, the attic hatch system comprising: an attic hatch structured to mount within the attic access conduit, the attic hatch comprising an insulative hatch body; one or more hanger parts structured to support the attic hatch within the attic access conduit in use, with each of the one or more hanger parts comprising: a top flange member extended laterally outward from the insulative hatch body to extend over and secure on a top shoulder of a structural member of the ceiling in use; a skirt structured to depend from the top flange member through the attic access conduit in use; and a base flange member structured to extend laterally inward, for example from the skirt, to define a seat that supports a base surface of the attic hatch.

A kit is disclosed comprising the one or more hanger parts and the attic hatch.

An attic hatch system is disclosed comprising: a ceiling formed of structural members and defining an attic access conduit; an attic hatch mounted within the attic access conduit, the attic hatch comprising an insulative hatch body; one or more hanger parts supporting the attic hatch within the attic access conduit, with each of the one or more hanger parts comprising: a top flange member extended laterally outward from the attic access conduit over and secured on a top shoulder of a structural member of the ceiling; a skirt depending from the top flange member through the attic access conduit; and a base flange member structured to extend laterally inward to define a seat that supports a base surface of the attic hatch.

A method is disclosed comprising: installing one or more hanger parts about an attic access conduit defined within a ceiling, by securing a top flange member or top flange members of the one or more hanger parts to a top shoulder or top shoulders of a structural member or structural members, respectively, of the ceiling; such that: the top flange member extends laterally outward from the attic access conduit over the top shoulder; a skirt of the one or more hanger parts depends from the top flange member through the attic access conduit; and a base flange member of the skirt extends laterally inward from the skirt to define a hatch seat.

In various embodiments, there may be included any one or more of the following features: The skirt or skirts of the one or more hanger parts form a peripheral skirt that is structured to line an interior wall of the attic access conduit in use; the top flange member or top flange members of the one or more hanger parts form a peripheral top flange member around the peripheral skirt; and the base flange member or base flange members of the one or more hanger parts form a peripheral base flange member around the peripheral skirt. The one or more hanger parts comprise four or more hanger parts mounted about the attic access conduit with each hanger part forming a side wall structured to line an adjacent respective side wall of four side walls, of the ceiling, that define the attic access conduit in use. The top flange member, skirt, and base flange member, of each of the one or more hanger parts, are formed of sheet parts. The attic hatch comprises a door panel; and the door panel is mounted adjacent or facing a floor-facing end of the insulative hatch body. The door panel defines the base surface, of the attic hatch, that rests upon the seat. The door panel is mounted adjacent a floor-facing end of the base flange member of the one or more hanger parts. The door panel is mounted to hinge relative to the skirt, between an open position and a closed position. The door panel is configured to move between the closed position and open position by sliding along an attic access conduit axis defined by the skirt, and swinging relatively to the skirt. A locking part to reversibly lock and unlock the attic hatch, for example the door panel, in a closed position. The locking part is configured to compress a gasket, of the attic hatch system, oriented to seal a periphery of the attic access conduit in use when in the closed position. A gasket, of the attic hatch system, is oriented to seal one or more of a periphery of the attic access conduit, or a periphery between the one or more hanger parts and the attic hatch, in use when in the closed position. The locking part is structured to form the base surface of the attic hatch that seats upon the base flange member when in the closed position. The one or more hanger parts comprise a riser extended above the top flange member. The riser comprises a material that has a lower heat conductivity than the skirt. The riser comprises insulative plastic or foam. The insulative hatch body extends along and within the skirt and the riser. The ceiling, with the one or more hanger parts supporting the attic hatch within the attic access conduit. For each of the one or more hanger parts, one or more fasteners securing the top flange member to the top shoulder of the structural member. The attic access conduit has four side walls; and the skirt or skirts of the one or more hanger parts form a peripheral skirt that lines interior surfaces of the attic access conduit in use. The skirt or skirts of the one or more hanger parts are spaced from the interior surfaces of the attic access conduit to define an annular cavity between the interior surfaces of the attic access conduit and an exterior wall of the skirt or skirts; and further comprising a peripheral insulative collar filling the annular cavity. The peripheral insulative collar is formed by a two-part expanding foam system. The attic hatch and one or both of the one or more hanger parts define a non-convective air gap therebetween, with a peripheral seal sealing therebetween. The top shoulders are defined by ceiling joists as the structural members. Mounting an insulative hatch body within the attic access conduit above the base flange member.

The foregoing summary is not intended to summarize each potential embodiment or every aspect of the subject matter of the present disclosure. These and other aspects of the device and method are set out in the claims.

BRIEF DESCRIPTION OF THE FIGURES

Embodiments will now be described with reference to the figures, in which like reference characters denote like elements, by way of example, and in which:

FIG. 3 is a view taken along the 3-3 section lines of FIG. 1 to illustrate the attic hatch system mounted on structural membranes of the ceiling, using dashed lines to indicate how the removable door panel is configured to slide off the attic hatch conduit in the illustrated embodiment.

FIGS. 4 and 5 are exploded views, partially in section, of a locking part in an open and closed position, respectively, and that may be used as a compression lock for the removable door panel of FIG. 3.

FIG. 8 is a cross-sectional view of another embodiment of an attic hatch system mounted on structural membranes of a ceiling, which differs from the embodiment of FIG. 7 in that the door panel is mounted to swing and depends from the ceiling rather than being nested within the ceiling as in FIG. 7, and with dashed lines used to illustrate the position of the door panel in an open position.

FIG. 9 is a cross-sectional view of another embodiment of an attic hatch system mounted on structural membranes of a ceiling, with the door panel and an insulative body of the hatch configured to be removed by pushing the body and door panel upward from below, with dashed lines used to indicate a path of the body and door panel during opening.

DETAILED DESCRIPTION

Figure 1:
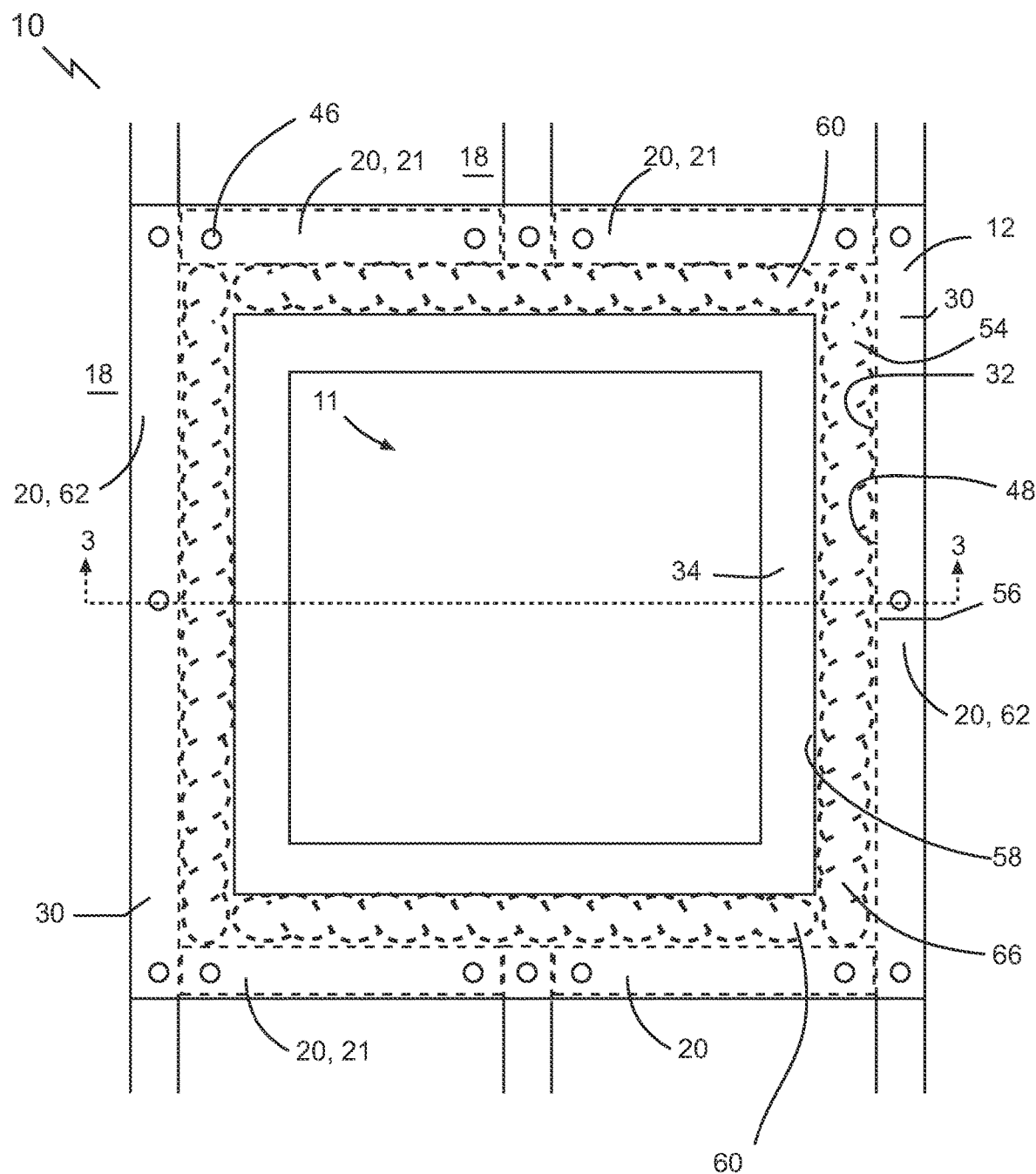
FIG. 1 is a top plan view of an attic hatch system mounted on structural members (joists) of a ceiling.

Immaterial modifications may be made to the embodiments described here without departing from what is covered by the claims.

The space between the roof and the ceiling of the top most floor of a house defines an attic. An attic (sometimes referred to as a loft) may include a space found directly below the pitched roof of a house or other building. An attic may also be called a sky parlor or a garret. An attic may be formed from a variety of framing techniques. One type of roof framing is built with roof trusses. Trusses are prefabricated structural frames that are delivered to the home construction site. The structural frames of the trusses have chords on top and bottom to frame the attic space. A webbing arrangement allows the trusses to distribute the load more broadly to the outside walls. A truss system may provide a useful attic, particularly if the trusses are mounted above the ceiling. An attic may also be constructed using stick roof framing, where the roof is framed with rafters and joists. Rafters are long wooden boards arranged sloping down from the peak of the roof, and are secured to the exterior walls with horizontal members called ceiling joists. The ceiling joists serve as the attic floor joist. Stick-framed roofs provide a fairly open space that may be used for storage or may be converted into an extra room in the house.

Typical homes in colder climates lose significant amounts of heat produced from central heating units due to improper or inherently limited insulation and construction materials and methods. Due to the fact that hot air rises by convection, the heat generated from heating systems may rise into the attic and thereafter escape through the roof either by radiative pathways, thermal bridge pathways, or improperly sealed junctions between structural parts. Proper air sealing and insulation reduce attic heat loss. Air sealing may reduce or eliminate holes and cracks through which heat escapes into or out of the attic. Insulation creates a thermal barrier along attic floor joists. A mix of different types of insulation methods is available for home builders to create an appropriate thermal insulation approach that may minimize the loss of heat through the attic space.

Insulation quality and effectiveness is a function of the factors that influence heat loss. The three main factors that determine heat loss are the surface area through which heat flows, the nature of the material, and the temperature gradient across the material. R-value is a measurement that considers the three factors that determine heat loss and grades different types of insulation materials and methods based on how well they keep heat from entering or leaving a house. A higher R-value rating shows a better-performing insulation type and traps heat better. Recommended home insulation R-values are different for different climates and different locations in the house. Houses in warmer climates may not require as much insulation, whereas houses in colder climates may require insulations with higher R-values. Within a house, basements and attic insulation usually have higher R-values than the floors or foundation walls of the house.

Different construction materials have different properties to be considered when planning for a building, such as a house, or a part of the house, such as an attic. One property that should be evaluated is the thermal conductivity of a material, to understand how heat may enter, move, or leave the building through a specific material or part of the house. A thermal bridge is formed by a material of relatively high thermal conductivity through which heat can travel, which may decrease the thermal resistance of a building if not combined with an appropriate thermal break. A structural material acting as a thermal bridge may move heat through conduction in the material from one place to another. In a house or attic, wood beams may act as thermal bridges that move heat along from a central heated area towards the walls and exterior, which has a lower temperature. Heat moves through a thermal bridge by conduction, for example through wood beams, which allows heat to escape the house. To reduce the negative heat loss effects of thermal bridging, one or more thermal breaks may be installed. A thermal break may be formed of a material with a relatively low thermal conductivity, such as fiberglass, foam, mineral wool, or other types of insulation, which prevents or limits heat from flowing from one place to another. An efficient thermal break may prevent thermal bridging, and therefore may prevent heat from escaping the house. An efficient thermal break may comprise continuous insulation that is uninterrupted by materials with high thermal conductivity. Continuous insulation acting as a thermal break may reduce the heat movement through building elements, thus improving the performance of the building envelope, and the energy efficiency of the house or attic.

Thermal conductivity quantifies and measures the ease with which heat is able to travel through a material by conduction. Conduction is the main form of heat transfer directly through insulation. In industry, thermal conductivity may be quantified using a λ, (lambda) value, with lower values reflecting lower conductivities. Common building materials with low thermal conductivity include oak wood (0.16λ), pine wood (0.12λ), polyvinyl chloride or PVC (0.12-0.25λ), paper (0.04λ), particle board (0.08-0.17λ), fiberglass (0.04λ) and expanded polystyrene (0.03λ).

An attic may incorporate a variety of insulative materials and methods. Some of these include spray foam insulation, rigid insulation board, batt insulation (such as fiberglass, cellulose or mineral wool), loose-fill insulation (such as fiberglass, cellulose or mineral wool), and structural insulated panels. In some cases, plural materials and methods may be combined to design a well-insulated attic.

An attic may be reversibly closed and opened by a suitable attic hatch. The function of an attic hatch may be to selectively allow passage or access to the attic space in a house when desired, and to block such access when not desired, to avoid unnecessary thermal bridging across the attic access conduit. An attic hatch may be located at a suitable location in the house or building, such as in a walk-in closet, a hallway, bedroom, or other location. There are several common types of attic access doors in use, including a simple attic hatch, a spring-loaded hatch, and a knee-wall access hatch. A simple attic hatch is also called a scuttle hole, and is common in many houses. A simple attic hatch may be a removable part of the ceiling having a square or rectangular shape. A ceiling cut-out may be pushed up and moved aside to open the access to the attic space. A ladder may be used, if needed, to enter the attic area. Another type of attic hatch is the spring-loaded attic hatch, which is a pull-down stair attic access door. A door is pushed up to release the spring-loaded door and an attached cord may be tugged to pull down a folded staircase that leads to the attic access. A built-in ladder may be a convenient element for homeowners to choose the spring-loaded attic hatch over the simple attic hatch. Another type of attic hatch is the knee-wall attic access door, which is installed on a vertical wall rather than the ceiling. This type of access is located at mid-height or knee-level and may be found in a room on the top level of the house where the ceiling is sloped. Choosing the appropriate type of attic access and proper installation of the door may affect the insulation and ventilation of the attic and of the house.

Figure 2:
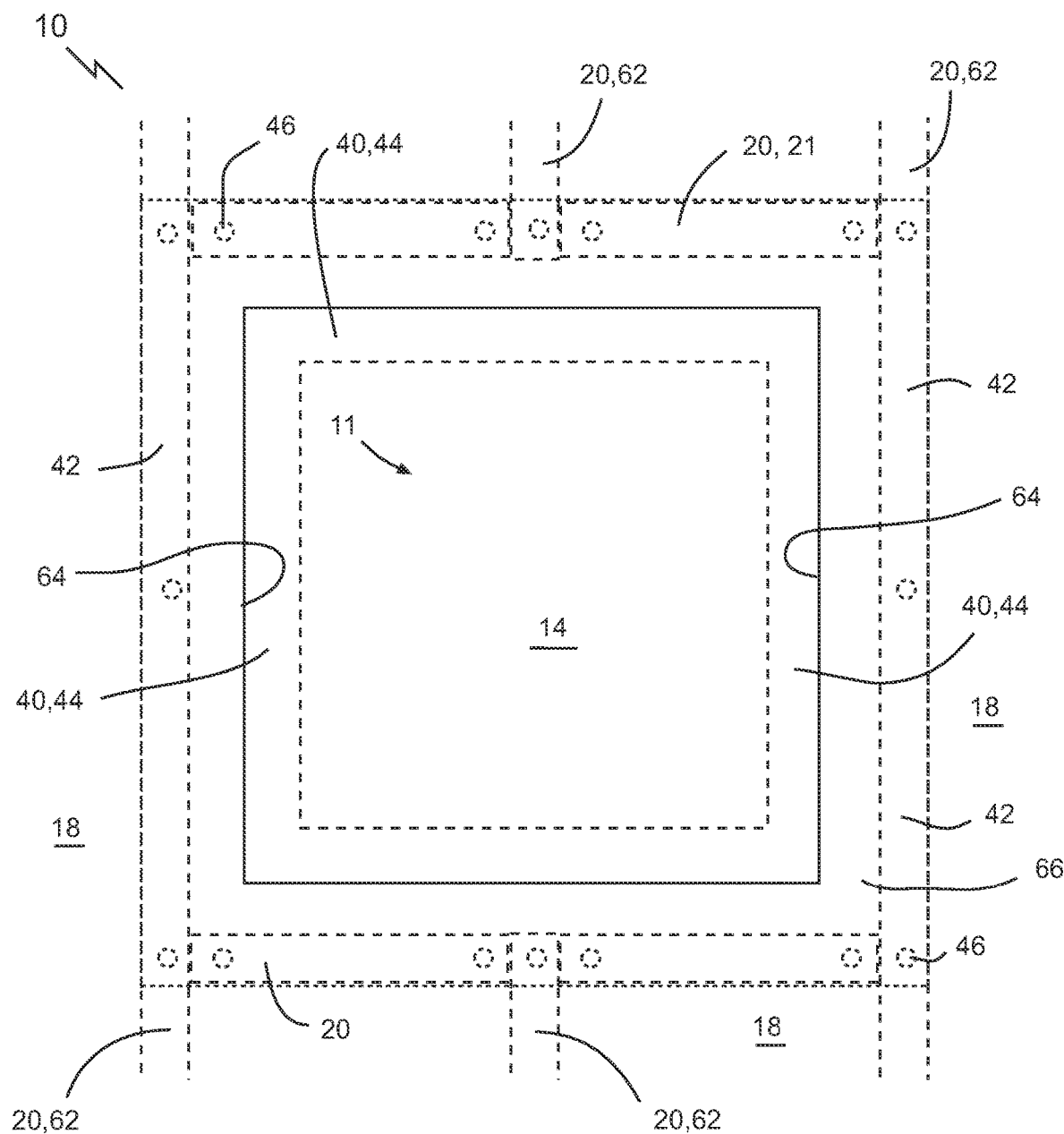
FIG. 2 is a bottom plan view of the attic hatch system of FIG. 1.

Referring to FIGS. 1-3, an attic hatch system 10 may comprise an insulative attic hatch 11 and one or more hanger parts 34. The attic hatch 11 may be structured to mount within an attic access conduit 32 defined by a ceiling 30 in use. The attic hatch 11 may comprise an insulative hatch body 14. In some cases, the attic hatch 11 comprises a door panel 22. The insulative hatch body 14 may be formed of a suitable insulative material, for example a material with R-value of 10 or higher, with some examples including but not limited to an encapsulated dense pack product made of XPS foam, such as StyroFoam™. The insulative body 14 may have a thickness selected to achieve a desired R-value. Referring to FIG. 3, the attic hatch 11 may be mounted to the ceiling 30, for example mounted within the attic access conduit 32. The ceiling 30 may comprise suitable structural members 20, for example ceiling joists 62. The ceiling 30 may comprise other suitable parts, such as one or more types of sheathing, such as drywall 12, particle board, plywood, and others. The one or more hanger parts 34 may be structured to support the attic hatch 11 within the attic access conduit 32 in use. The parts of the attic hatch system may also form a kit, for example a kit comprising one or more hanger parts 34 and the attic hatch 11. In this document, whether hanger parts are referred to in plural or singular, it should be understood that one or more or all of the hanger parts may satisfy the stated conditions or have the stated features.

Referring to FIGS. 1-3, the one or more hanger parts 34 may have one or more components, such as one or more of a top flange member 36, a skirt 38, and a base flange member 40. The top flange member 36 may be extended laterally outward from the insulative hatch body 14, for example to extend over and secure on a top shoulder 42 of a structural member 20 of the ceiling 30 in use. The top flange member 36 may, more generally, secure the one or more hanger parts 34 to the structural members 20 of the attic access conduit 32. The top shoulders 42 may define a top surface of the ceiling joists 62. The top flange members 36 of the one or more hanger parts 34 may be secured to the top shoulder 42 of the structural members 20 by one or more fasteners 46. The skirt 38 may be structured to depend from the top flange member 36 through the attic access conduit 32 in use. The skirt 38 may be shaped to line, for example conform to the shape of, an interior wall or walls 58 of the attic access conduit 32 in use. The hanger parts 34 may also have a skirt 38, which may depend from the top flange member 36 and extend through the attic access conduit 32. The skirt may extend from the top flange member 36 towards the base flange member 40 to link the top flange member 36 and the bottom flange member 40. The base flange member 40, for example a base support member, may seat the insulative hatch body 14, for example at least when the attic hatch is in a closed position. The base flange member 40 may be structured to extend laterally inward, for example laterally inward from the skirt 38, to define a seat 44, at least in the closed position, that supports, at least in the closed position, a base surface 16 (i.e., a floor-facing surface) of the attic hatch 11. The one or more hanger parts 34 of the attic hatch system 10 may allow the attic hatch system 10 to be positioned about the attic access conduit 32 of the ceiling 30. In this document, references to floor or roof facing surfaces are understood to refer to orientations when installed, with the parts facing either toward a floor of the upper floor of the house (or a wall in the case of a vertical hatch), or toward the roof of the house (or a wall within the attic in the case of a vertical hatch). The hanger part 34 may have a suitable cross-sectional shape, such as an S-shape as shown. The base flange member 40 may be formed of and/or act as tabs that support the body 14. In some cases, the base flange member 40 forms a seal against the body 14, for example the flange member 40 may comprise a peripheral gasket between flange member 40 and body 14.

Referring to FIGS. 1-3, in use, the hanger parts 34 of the attic hatch system 10 may be installed in a ceiling 30 through the attic access conduit 32 of the structural members 20. The method may include one or more mounting stages, such as mounting the insulative hatch body 14 within the attic access conduit above the base flange member 40. As above, the ceiling 30 may define the attic access conduit 32. The ceiling 30 may be formed of a plurality of structural members 20, such as ceiling joists 62. Some of the structural members 20 may be modified to fit the system 10 and/or provide an attic access conduit 32. Referring to FIGS. 1-2, the ceiling joists 62 may be spaced evenly, for example in parallel runs in a horizontal plane, creating a support structure for the ceiling 30. Modified structural members, such as blocking (structural members 21), may be installed in a ceiling 30, for example in runs perpendicular to members 20, for example bridging adjacent members 20, to enclose and define the side walls 58 of the conduit 32, creating the opening in the ceiling 30. The structural members 20 may thus be configured to define the attic access conduit 32. The attic access conduit 32 may be the cavity through which the attic hatch 11 may be supported by the one or more hanger parts 34.

Referring to FIGS. 1-3, the one or more hanger parts 34 may collectively, or individually if one hanger part 34 is present, extend about the periphery of the attic access conduit 32. The skirt or skirts 38 of the one or more hanger parts 34 may form a peripheral skirt that is structured to line an interior wall 58 of the attic access conduit 32 in use. The top flange member 36 or top flange members 36 of the one or more hanger parts 34 may form a peripheral top flange member 36 around the peripheral skirt, for example around the attic access conduit 32. Referring to FIGS. 1 and 2, the components of the one or more hanger parts 34 may be integrally connected or formed to extend circumferentially about the attic access conduit 32. The attic access conduit 32 may have a suitable number of side walls, such as four side walls 58, arranged in a suitable orientation such as a square or rectangle. The base flange member or base flange members of the one or more hanger parts may form a peripheral base flange member around the peripheral skirt, for example around the attic access conduit 32. For example, as shown in FIG. 1, a single unitary hanger part 34 is formed or assembled into a square or rectangular shape to conform with the shape of the attic access conduit 32. In some cases, plural hanger parts 34 may cooperate to extend at least partially around a periphery of the attic access conduit. Each hanger part 34 may cover a respective zone of the periphery defined by the interior walls 58 of the conduit 32. In one example (not shown), each wall 58 may have mounted thereon a respective hanger part 34. The hanger parts 34 may be connected together, spaced from one another, or overlapping one another. A suitable connector, such as adhesive, brackets, or pressure sensitive tape, may be used between the parts. For new builds a user may prefer a single frame formed of an integral peripheral hanger part 34 for air tightness, which may be installed from the top, with blocking placed between joists perpendicular to the trusses for the frame to sit upon. The hanger parts 34 may comprise material with a relatively low thermal conductivity, for example sufficient to create a thermal break along the top flange member 36 (over the stud/joist) and/or skirt 38. In some cases, a gasket, or other insulative material (not shown) such as pressure sensitive double-sided tape, may be located underneath (on a base surface of) the top flange member 36, for example forming a peripheral seal and thermal break around the periphery of the conduit 32.

Referring to FIGS. 1-3, the attic hatch system 10 may comprise a peripheral insulation collar 60 surrounding an exterior of the hanger part or parts 34. The collar 60 may be formed circumferentially around the exterior of the hanger part 34, between the hanger part 34 and the attic access conduit 32. The skirt 38 or skirts 38 of the one or more hanger parts 34 may line the interior surfaces 48 of the side walls 58 of the attic access conduit 32 and be spaced off of the conduit 32 to define an annular cavity 54. The annular cavity 54 may be defined between the interior surface 48 of the attic access conduit 32 and an exterior surface 56 of the skirt 38 or skirts 38. The annular cavity 54 may be filled by the insulation collar 60.

Referring to FIGS. 1-3, the collar 60 may be formed by a two-part expanding foam system. The peripheral insulative collar 60, such as the two-part expanding foam, may fill the annular cavity 54 and provide insulative properties of the attic hatch system 10. The use of a two-part expanding foam system, such as a spray foam system, may operate to effectively fill the void of cavity 54, filling air gaps and forming a peripheral seal and thermal break across the cavity 54. Spray foam may refer to a chemical product created by combining a two-part system, for example isocyanate and polyol resin, which react when mixed with each other and may expand up to 30-60 times of liquid volume after being sprayed in place, in a relatively short period of time. The ability of such foam to expand makes it useful as an insulating material, which is able to form to the shape of the cavity being filled to reduce or eliminate air gaps and produce a relatively high thermal insulating value with virtually no air infiltration. Spray foams may be provided in open-cell and closed-cell foam insulation. Open-cell spray foam generates fluffier, porous, low-density foam that expands many multiples of its initial size upon application and works well to minimize leaks in difficult to reach areas. Open-cell foam may have example R-values of R-3.5 to R-3.6 per inch. Closed-cell foam insulation may not expand as much as open-cell but may have a higher R value than an open-cell foam, with example R-values of about R-4.9 to R-7.1 per inch, and may allow addition of other insulative materials.

Referring to FIGS. 1-3, and 6-9, one or more of the components of the one or more hanger parts 34 may be formed of sheet parts or one or more sheets. The hanger part 34, or part of it, may be formed from a folded sheet. Top flange member 36, skirt 38, and base flange member 40 may be formed from a folded sheet, for example made of 22-to-30-gauge aluminum or steel, for example 25-28-gauge aluminum or steel, or other suitable materials and gauges of sheets. In some cases, the hanger part 34 or part of it is formed with plural sheets layered together, for example bonded or fused together. The sheet that forms the hanger part 34 may be bent in a suitable fashion to achieve the functionality described in this document. The hanger part 34 may have a first span or sheet part that is shaped, for example bent, to form, the top flange member 36 and the skirt 38. Bends in this document may be formed by a suitable method, for example using a power bending tool such as a device that shapes the hanger part 34 using a plurality of rollers, such as a roll-forming machine. Roll forming is a type of rolling involving the continuous bending of a long strip of sheet metal (typically coiled steel) into a desired cross-section. The base flange member 40 may be bent relative to the skirt 38 to form the base flange member 40. The hanger part 34 may be formed from a single sheet, which may be folded about horizontal and vertical bends to form the unitary peripheral hanger part 34 shown.

Referring to FIG. 3, the attic hatch 11 may comprise a door panel 22. A door panel 22 may cooperate with the system 10 to selectively provide and block access to the attic access conduit 32. The door panel 22 may comprise rigid material, such as wood, metal or plastic, which may support or protect the insulative hatch body 14. The door panel 22 may be attached to or (as shown) independent from the hatch body 14. The door panel 22 may comprise an insulative component, such as a foam backing on a rigid plate (not shown). The door panel 22 may open and close by a suitable method, such as by removal off of the ceiling 30 as shown with a simple hatch embodiment, or by a variety of suitable sliding or swinging mechanisms. In the example shown, the door panel 22 is mounted adjacent or facing a floor-facing end (base surface 16) of the insulative hatch body 14. In a simple hatch embodiment is shown, the door panel 22 is mounted adjacent a floor-facing end (base surface 16) of the base flange member 40 of the one or more hanger parts 34, and the door panel 22 is configured to slide axially (along an axis 49 defined by the skirt 38 and/or attic access conduit 32. In the example shown, to open the conduit 32, the user removes the door panel 22 from a door panel receiving portion 31 of a base portion of the attic access conduit 32, and to close the conduit 32, the user inserts the door panel 22 into the door panel receiving portion 31.

Referring to FIGS. 3-5, a locking part may be provided to reversibly lock and unlock the door panel 22. The door panel 22 may be mounted below the insulative hatch body 14, in which the base flange member 40 may be in between the door panel 22 and the insulative hatch body 14. The door panel 22 may be level with the ceiling 30 when closed, in which position the locking part or parts 24 may align to permit a user to engage or disengage the locking part to lock the door panel 22 in place in the closed position. Thus, in the example of FIG. 3, prior to sliding the door panel 22 out of the door panel receiving portion 31, the user may unlock locking parts 24, and to close the hatch system 10, the user may slide the door panel axially into the portion 31, and thereafter lock the locking part or parts 24 to the ceiling 30 or hanger part 34. In the example shown, the locking part or parts 24 engage a corresponding structure, such as a catch (not shown) mounted on the ceiling 30, for example mounted on a drywall clip 41 or retainer. Referring to FIGS. 3-5, the attic hatch system 10 may have a plurality of locking parts 24 that engage and disengage to reversibly lock and unlock a door panel 22 in the attic hatch system 10. Two examples of latches are shown, with a simplified latch shown in FIG. 3, and a hinged compression latch shown in FIGS. 4-5. A latch may be used to lock the attic hatch in place in the ceiling 30. A latch includes mechanical components that allow for the temporary joining of door parts. Latches are mostly seen on doors and enclosure openings, and may also be used in devices such as seat belts, clamps, straps, and objects with retractable parts. Different designs feature various methods of actuation, holding style, and mounting. Various forms of latches that may be used include slide bolt, slam, draw, spring, cam, over-the-center and other latches.

Referring to FIGS. 4-5, an example of a latch is illustrated. A hand-operated lever 74 of a latch 76 may be mounted, for example via a pivot bracket 70 to the door panel 22, although in other cases the lever 74 may be mounted to the ceiling 30 or other suitable structure such as the hanger part 34. The latch lever 74 may be mounted to allow the latch 76 to rotate axially about a pivot axis 72. A catch 80 may be attached to a surface adjacent the door panel 22, such as the ceiling 30, to receive the latch lever 74, although this orientation could be reversed with the latch on the ceiling/hanger part and the catch on the door panel. The locking part 24 may reversibly lock and unlock a door panel 22 in a closed position and open position, respectively. Referring to FIG. 4, when in the closed position a hooking part 78 may engage a hole 82 in the catch 80, although in other cases the catch 80 has a hooking part that engages a hole in the latch. Referring to FIG. 5, when in the open position, the catch and hooking part 78 may be disengaged, for example by pivoting the latch 76 about axis 72 to open the jaw or hooking part 78. Referring to FIGS. 4-5, the locking part 24 may be configured to compress a gasket 43 to seal the attic hatch 11 to the ceiling 30, for example to seal between a door panel 22 and a periphery of the attic access conduit 32 when in the closed position, as shown in the door panel 22 in solid lines in FIG. 3. A suitable gasket may be made of suitable material, such as rubber or silicon, either resilient or flexible in construction to permit reversible deformation under pressure. The gasket 43 may be oriented to seal a periphery of the attic access conduit 32 in use when in the closed position. When in an open position, the locking part 24 may release the hook part 78 from the hole 82 in the catch 80, as shown in FIG. 5, which may allow the door panel 22 to be disengaged from the attic hatch system 10, as shown in the door panel 22 in dashed lines in FIG. 3.

Figure 6:
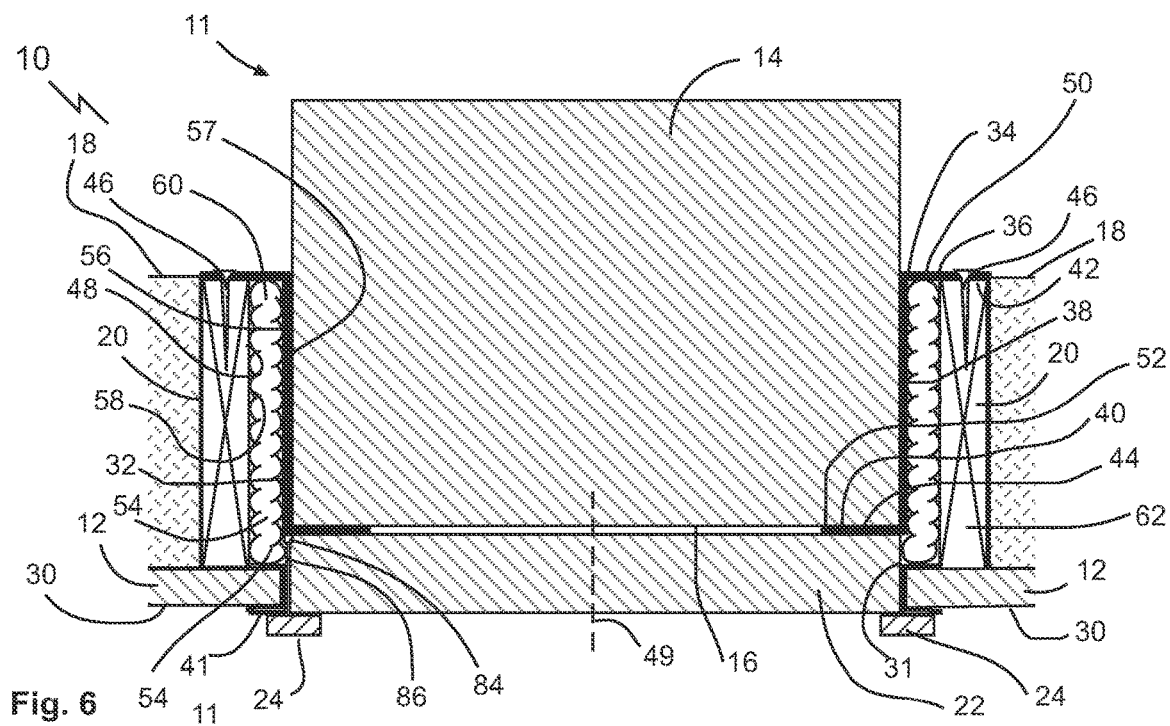
FIGS. 6 and 7 are cross-sectional views of another embodiment of an attic hatch system mounted on structural membranes of a ceiling, with a door panel that is configured to move from a closed position (FIG. 6) by sliding and swinging into an open position (FIG. 7), via a slide guide, with dashed lines used to illustrate the position of the door panel while swinging (FIG. 7).
Figure 7:
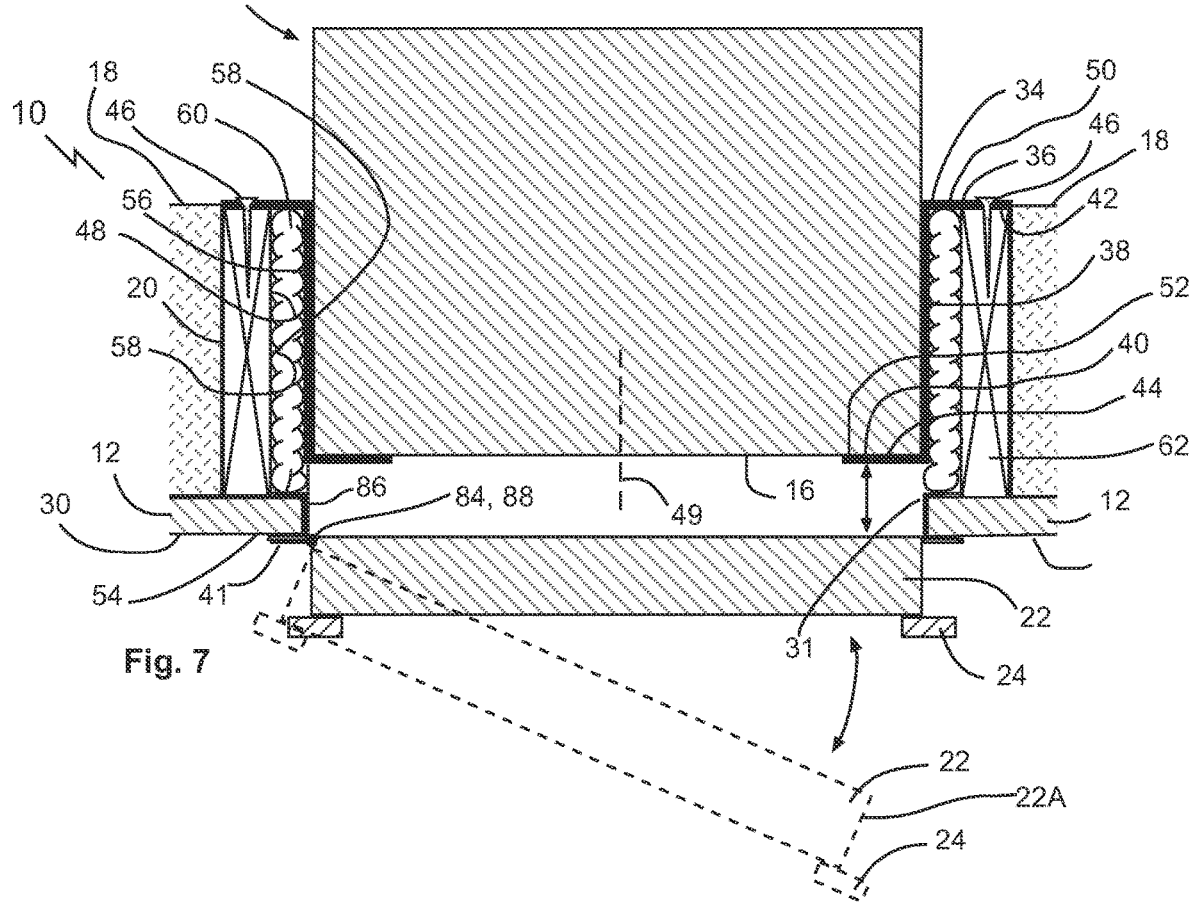
Figure 10:
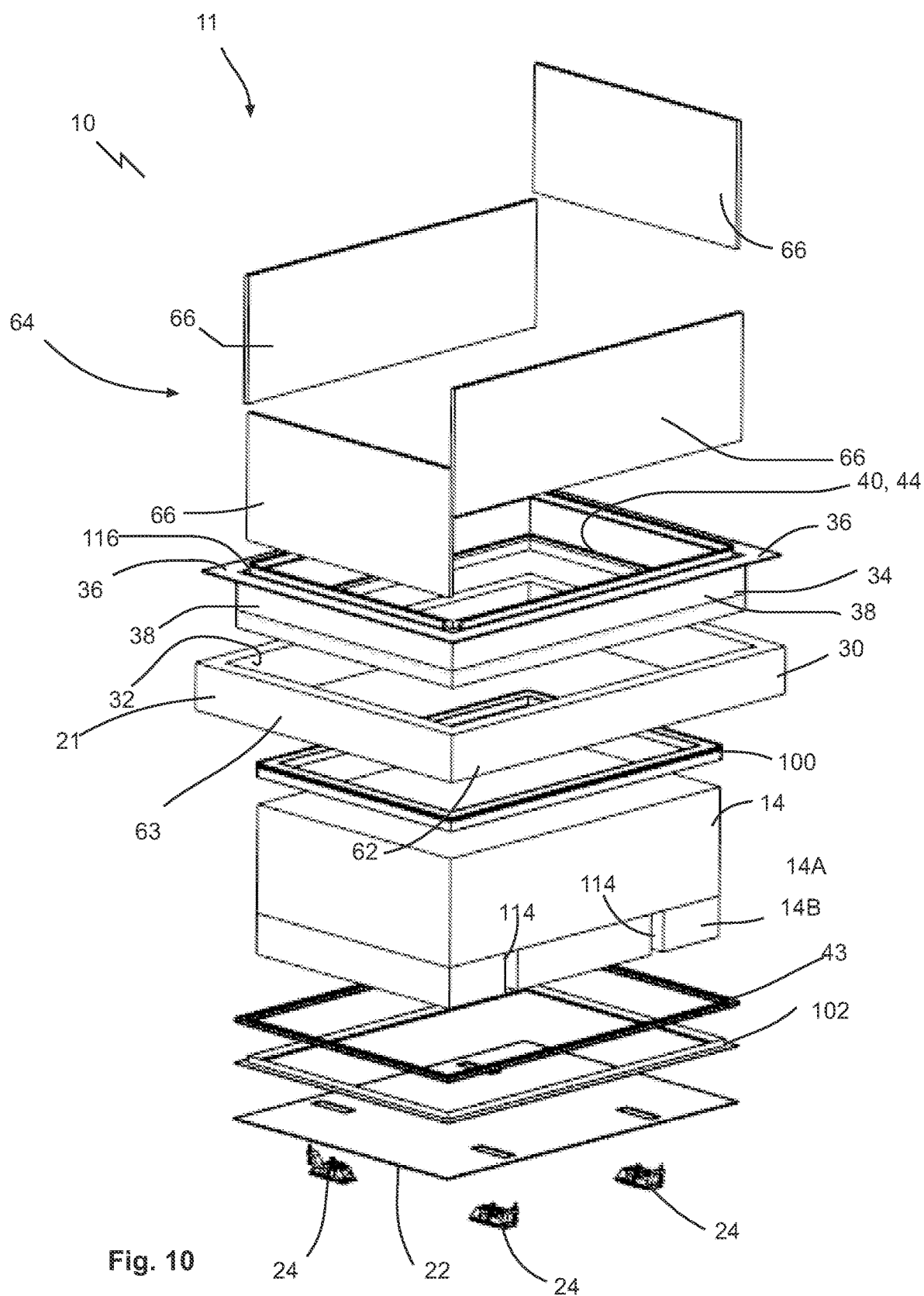
FIG. 10 is an exploded perspective view of another embodiment of an attic hatch system with a ceiling frame and compression latches.
Figure 11:
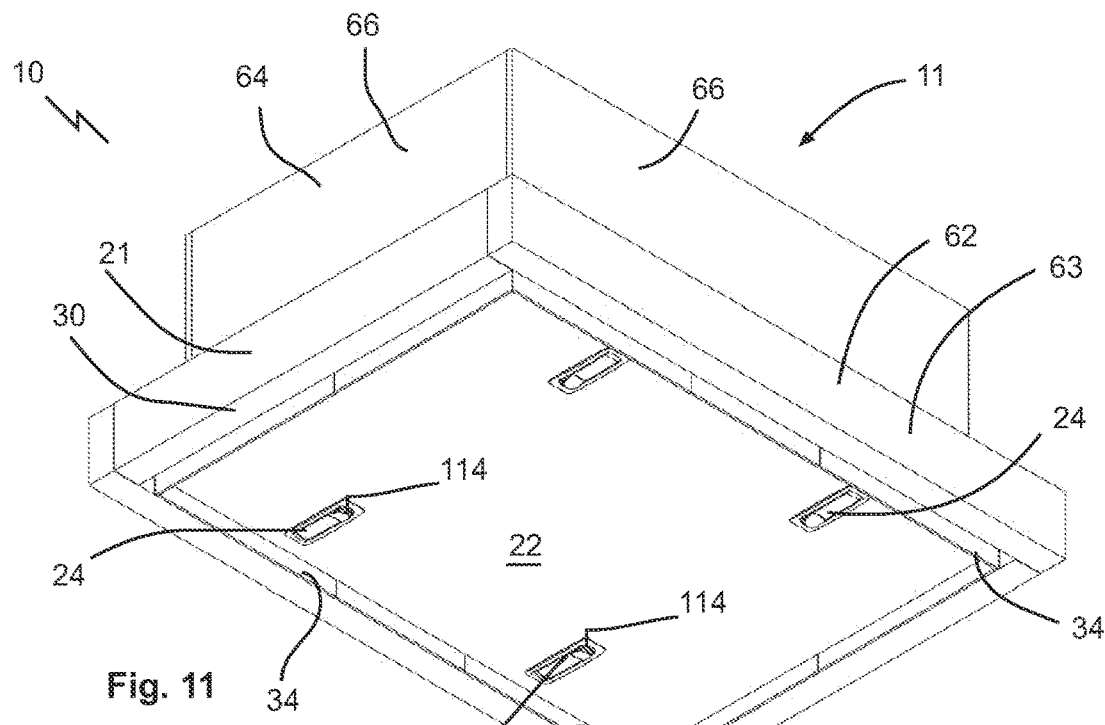
FIGS. 11 and 12 are bottom perspective and base plan views, respectively, of the attic hatch system of FIG. 10.
Figure 12:
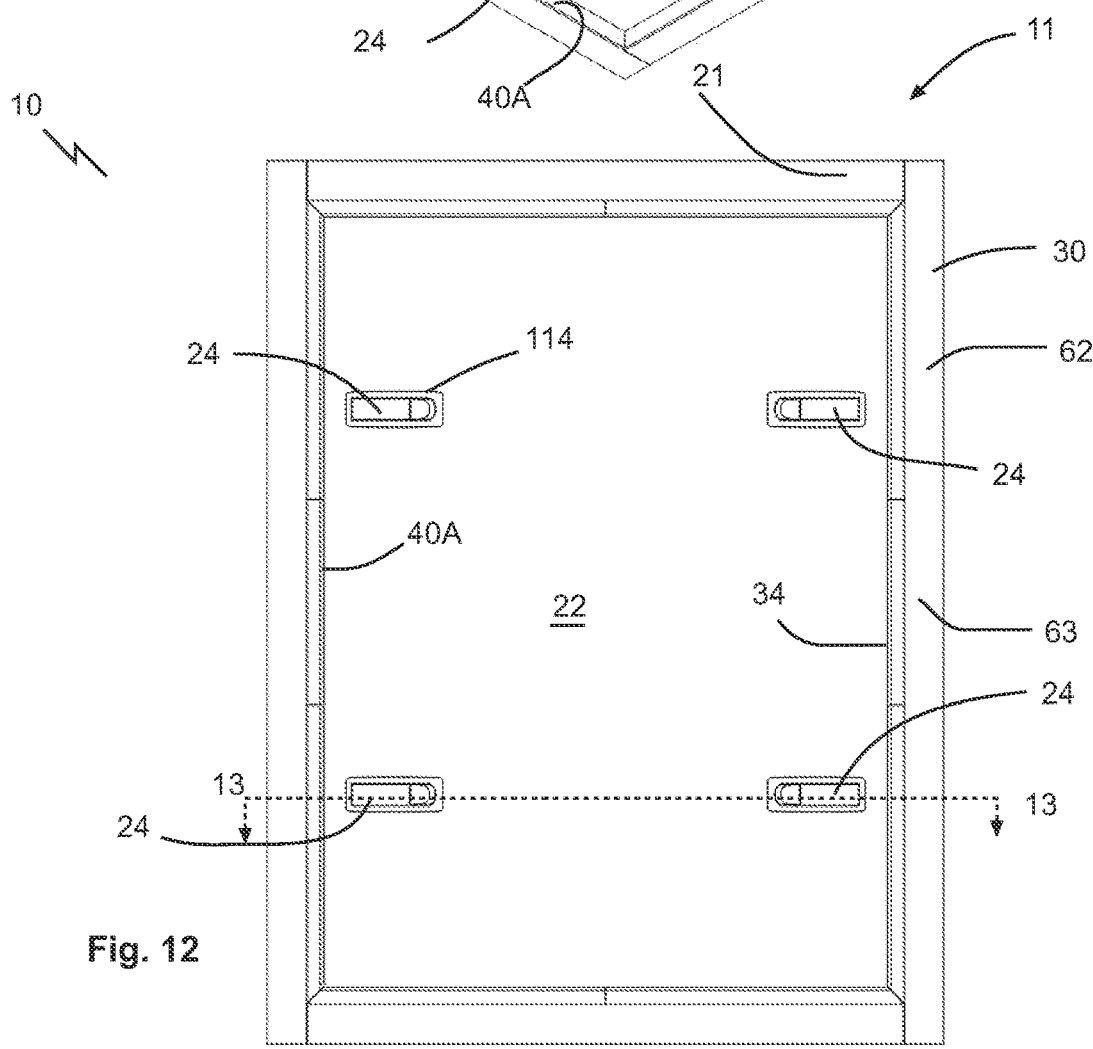
Figure 13:
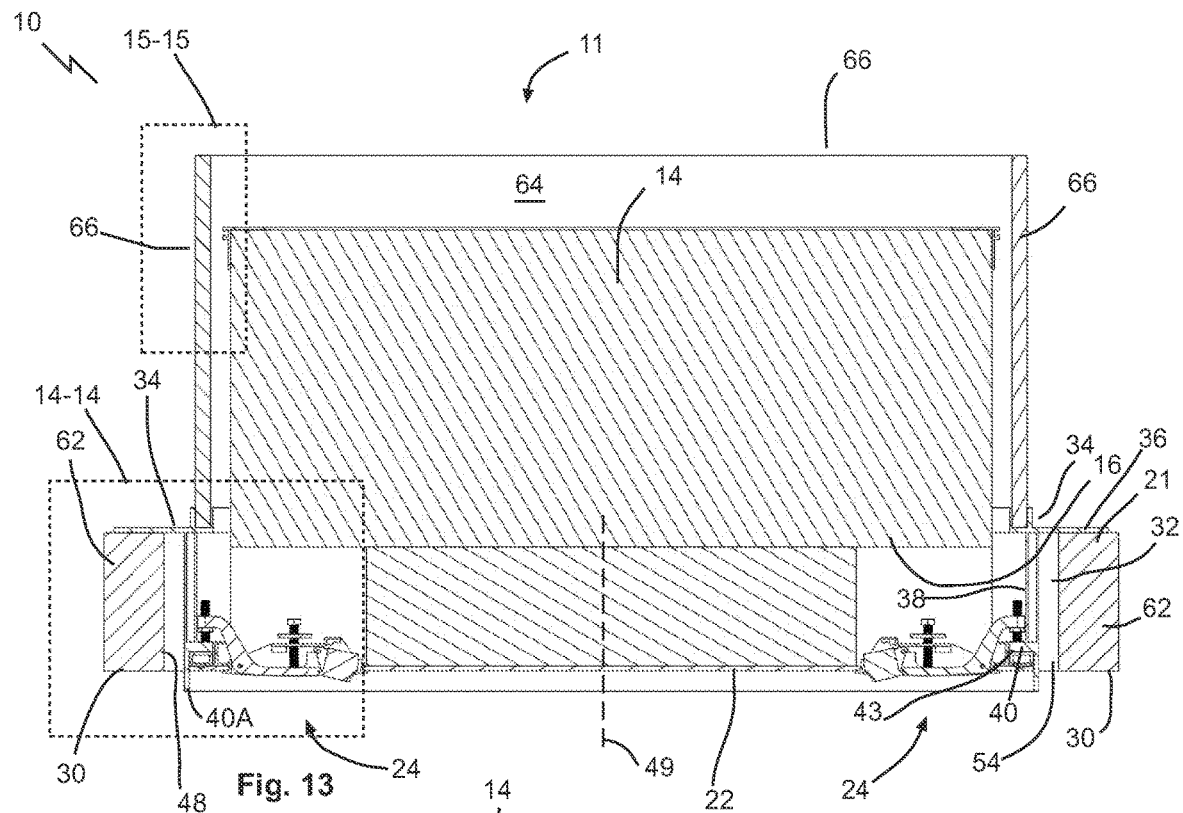
FIG. 13 is a cross-sectional view taken along the 13-13 section lines of FIG. 12.
Figure 14:
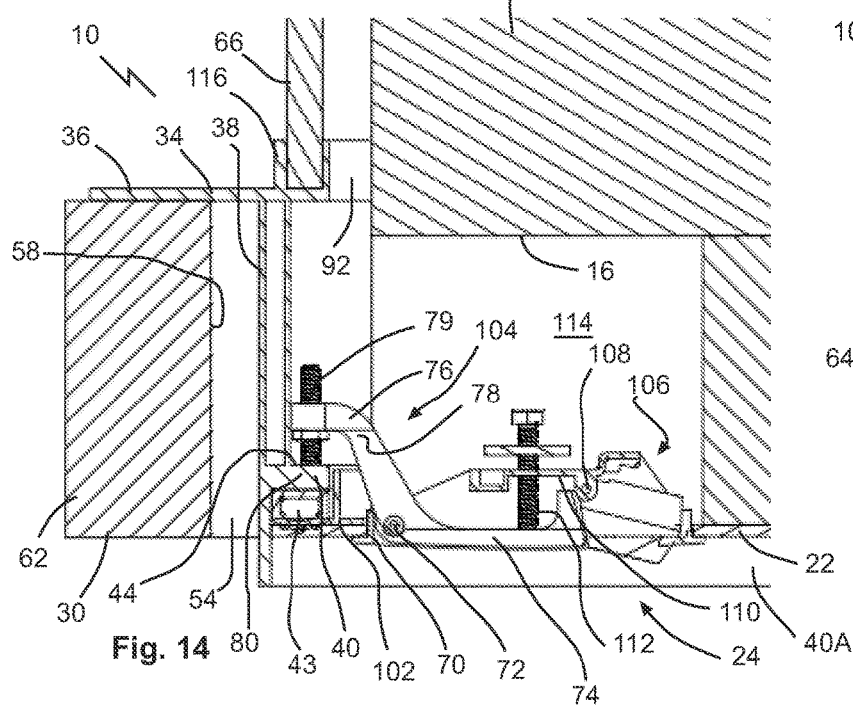
FIG. 14 is a close-up of the section denoted by the area shown in dashed lines and demarcated as 14-14 in FIG. 13.

Referring to FIGS. 6-7, an embodiment of an attic door hatch system 10 is illustrated that opens and closes via a compound movement. The door panel 22 may be mounted to hinge relative to the skirt 38 and/or attic access conduit 32, between an open position (a partially open position is illustrated in FIG. 7 for ease of illustration) and a closed position (FIG. 6). The door panel 22 may be configured to move between the closed position and open position by sliding axially (for example along axis 49) out of the interior attic access conduit 32, for example out of door panel receiving portion 31, and swinging relatively to the skirt 38. Such a configuration may allow the door panel 22 to nest within the portion 31 of the conduit 32 when closed, which may allow a base surface of the door panel 22 to sit flush with or inset a plane defined by a floor-facing base surface of the ceiling 30. The compound movement may be facilitated by suitable machinery. For example, the door panel 22 may be mounted to the ceiling 30 on a slide guide 86. The door panel 22 may be mounted to pivot relative to the slide guide 86, for example via a pivot axle 84. Referring to FIG. 6, an opening procedure may begin with the door panel 22 in a closed position with the locking parts 24 engaged. In the closed position, the axle 84 may be immobilized due to the geometric constraints of the door panel receiving portion 31. The door panel 22 may be configured to move between the closed position and open position by sliding axially out of the attic access conduit 32 along axis 49. Any locking parts 24 used may be open prior to sliding, or at least prior to pivoting of the door panel 22. Referring to FIG. 7, once the door panel 22 has slid a sufficient axial distance out of portion 31, in order for terminal nose 22A to clear the portion 31, the door panel 22 may be pivoted, for example about axle 84, into an open position. Once open, the door panel 22 may allow access to the attic access conduit 32. The open position and swung position of the door panel 22 may allow access to the attic hatch 11 and the hanger parts 34.

Referring to FIG. 8, in another embodiment, the door panel 22 may swing open and closed. The door panel 22 may be mounted to the ceiling 30, for example mounted to hinge to clips 41. The door panel 22 may be configured to swing about a hinge door axle 90, which may be mounted to the ceiling 30 or hanger part 34 or another suitable part. Locking parts 24 may be used as before to lock and unlock the door panel 22 in the closed position. Once unlocked, the door panel 22 may be free to swing about an axis defined by axle 90, although the panel 22 may swing such that axle 90 swings while travelling along a curved path in other cases.

Referring to FIG. 9, in another embodiment, the door panel 22 may rest upon or otherwise above the seat 44 defined by the base flange member 40. The door panel 22 in this embodiment may define the base surface 16, of the attic hatch 11, which may rest upon the seat 44 of the one or more hanger parts 34. The door panel 22 and the insulative hatch body 14 may be bonded or fused together, or may be loosely and independently stacked together in the conduit 32. Access through the conduit 32 may be achieved by applying a force in an upward or axial direction (along axis 49), in order to push the door panel 22 and body 14 axially out of clearance with the hanger parts 34 and conduit 32. In the example shown, pushing the fused door panel 22 and hatch body 14 upward may displace the door panel 22 and hatch body 14 from the attic access conduit 32 and from the seat 44.

Referring to FIG. 9 again, the hanger parts 34 may define a riser 64 extended above the top flange member 36. The riser 64 may comprise insulative material, for example material with low thermal conductivity, for example fiberglass. The riser 64 may comprise material that has a lower heat conductivity than the skirt 38. The riser 64 may comprise suitable insulative material, such as insulative plastic or foam. The riser 64 may be configured to provide a thermal break. A thermal break may prevent heat from flowing from one place to another, which may limit heat that may travel through the skirt 38 through the riser 64, and thereafter escape through the attic. In some cases, all or a portion of one or more of the top flange member 36, skirt 38, and base flange member 40 may comprise insulative material sufficient to provide a thermal break. The insulative hatch body 14 may extend along and within the skirt 38 and the riser 64. The insulative riser 64, which may act as a thermal break, may provide additional insulation for the attic hatch system 10.

Figure 15:
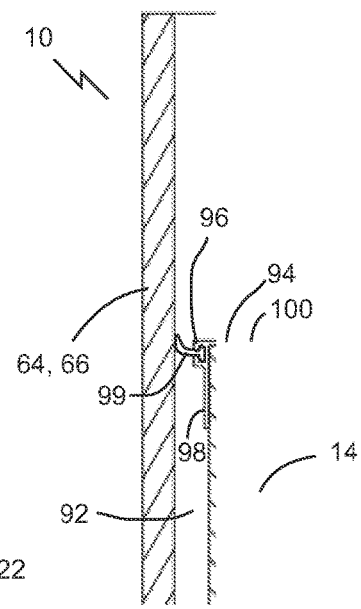
FIG. 15 is a close-up of the section denoted by the area shown in dashed lines and demarcated as 15-15 in FIG. 13.

Referring to FIGS. 10-15, a further embodiment of an attic hatch system 10 is illustrated. In the example shown, the ceiling 30 is illustrated by structural members 21 and joists 62 formed into a joist frame 63, which defines the attic access conduit 32 as shown. The joist frame 63 may or may not form part of a kit or product that is provided along with the system 10. In the example shown, the riser 64 is formed by a plurality of boards 66 arranged into a rectangular configuration. The boards 66 may fit within a suitable board receiver structure, such as a peripheral U-slot 116 defined by the hanger part 34. The hanger parts 34 extend about the periphery of the attic access conduit 32 as shown, forming a collar. The base flange member 40 is defined as a shelf on the interior surface 57 of the hanger part 34. The member 40 may be defined partway up the height of the hanger part 34 as shown, or at the bottom of the hanger part 34. The insulative hatch body 14 may be sized to fit within the riser 64 and hanger part 34. The attic hatch 11 and one or both of the one or more hanger parts 34 and the riser 64 may define a non-convective air gap 92 therebetween. The hatch 11/body 14 may also be sized to fit within, for example abut interior surfaces of, the riser 64 and/or hanger part 34 in use. A top profile collar 100 may be provided to fit on a top end of the insulative hatch body 14. Referring to FIG. 15, the collar 100 may be structured to mount weatherstripping 99 to act as a peripheral seal to seal the body 14 to the surrounding structure, such as riser 64. The weatherstripping 99 may have a bulbed end fit within a bulbed end receiver, such as a T-slot 96 in the collar 100. The collar 100 may have other suitable parts, such as a top profile skirt 98 and a top profile top flange 100, and may be secured to the body 14 by a suitable method such as via adhesive or fasteners. Referring to FIGS. 10-15, an air gap 92 between the exterior surfaces of body 14 and the riser 64 or hatch parts 34 may facilitate removal and installation of the hatch body 14 in the attic access conduit 32. The attic hatch body 14 may be divided into plural parts secured together, for example top and base parts 14A and 14B, respectively, adhered by adhesive. A gasket 43, such as a peripheral gasket 43, may be provided to seal the attic hatch 11 to the structure, for example to seal a door panel or part 22. The gasket 43 may mount upon a peripheral seal holder collar 102.

Referring to FIGS. 10-15, one or more locking parts 24, such as compression latches, may be used about the periphery of the door part 22, for example fitting in respective locking part receiving cavities 114 in the insulative hatch body 14 and/or door part 22. In the example shown, the locking parts 24 secure, in the closed position, the attic hatch 11, by swinging down to engage the base flange member 40 of the hanger part 34. Referring to FIG. 15, the locking parts 34 shown may operate via a two part lock, for example a lever 74 with latch 76, coupled with a secondary locking part 106 to secure the latch 76 in the locked position shown. The lever 74 may be mounted to the hatch body 14/door part 22 at a pivot axis 72. An adjustable stop 79 may be mounted to the latch 76 or hooking part 78, for example a threaded stop as shown, to permit adjustment of the compression force achieved against the seat of base flange member 40 when the locking part 24 is in the closed position. The secondary locking part 106 may be mounted to a bracket 110 to define a pivot axis 108 (for example a horizontal pivot axis as shown). The bracket 110 may be mounted to or form part of the attic hatch 11, for example the body 14 or door part 22. The bracket 110 may include an adjustable threaded stop 112 to adjust the compression achieved by the locking part 106 when in the locked position. The locking part 106, when locked, will restrain the lever 74 and latch 76 from release until the locking part 106 is depressed or otherwise released. When locked, the locking part 24 may compress gasket 43 against the structure. In the example shown, the gasket 43 is mounted to a seal collar 102 that is mounted to an upward-facing surface of the hatch 11, to press against a base surface of the base flange member 40.

Figure 16:
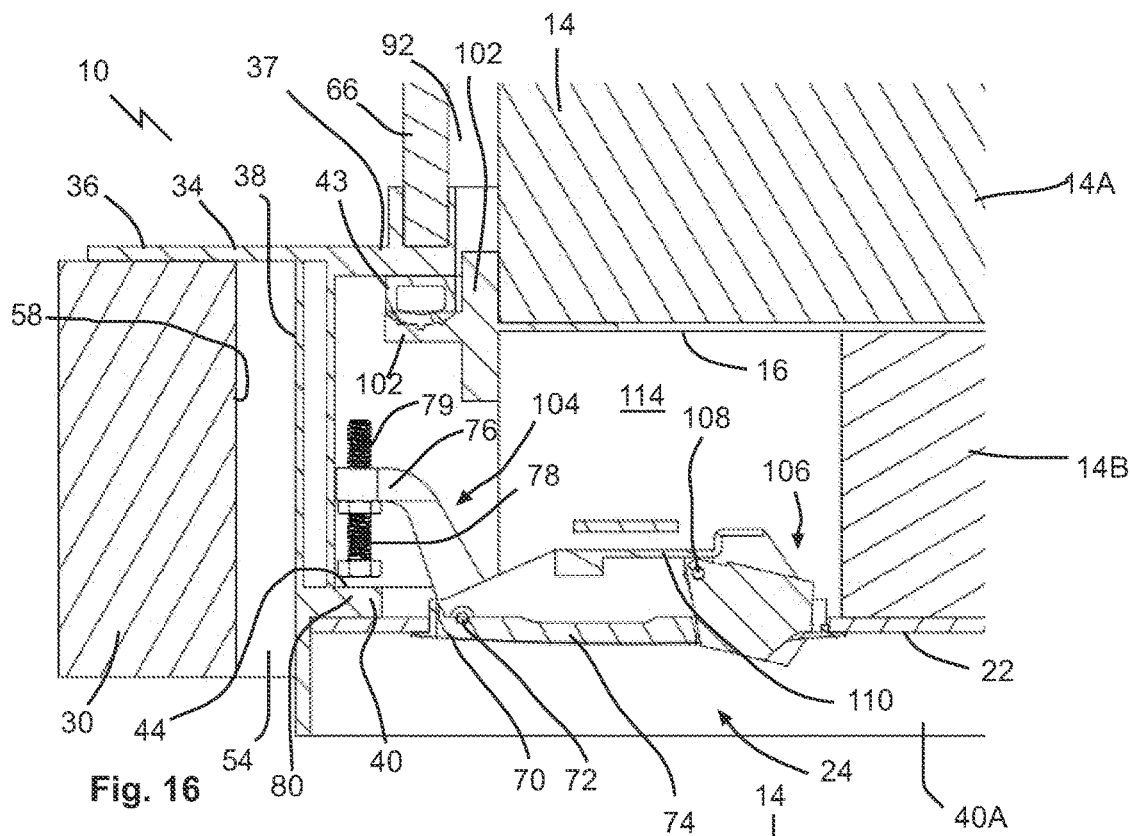
FIGS. 16 and 17 are cross-sectional views of another attic hatch system, illustrating a different method of mounting a door seal than shown in FIG. 12.
Figure 17:
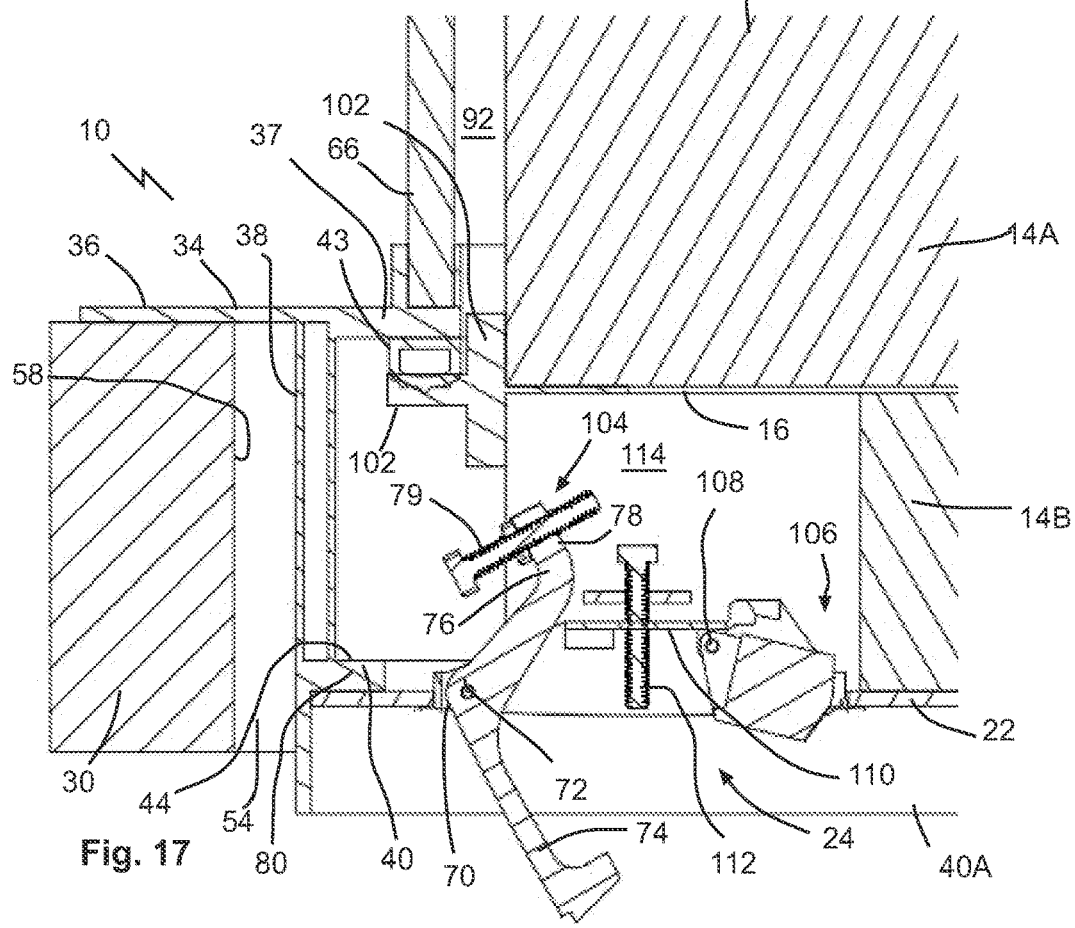
Figure 18:
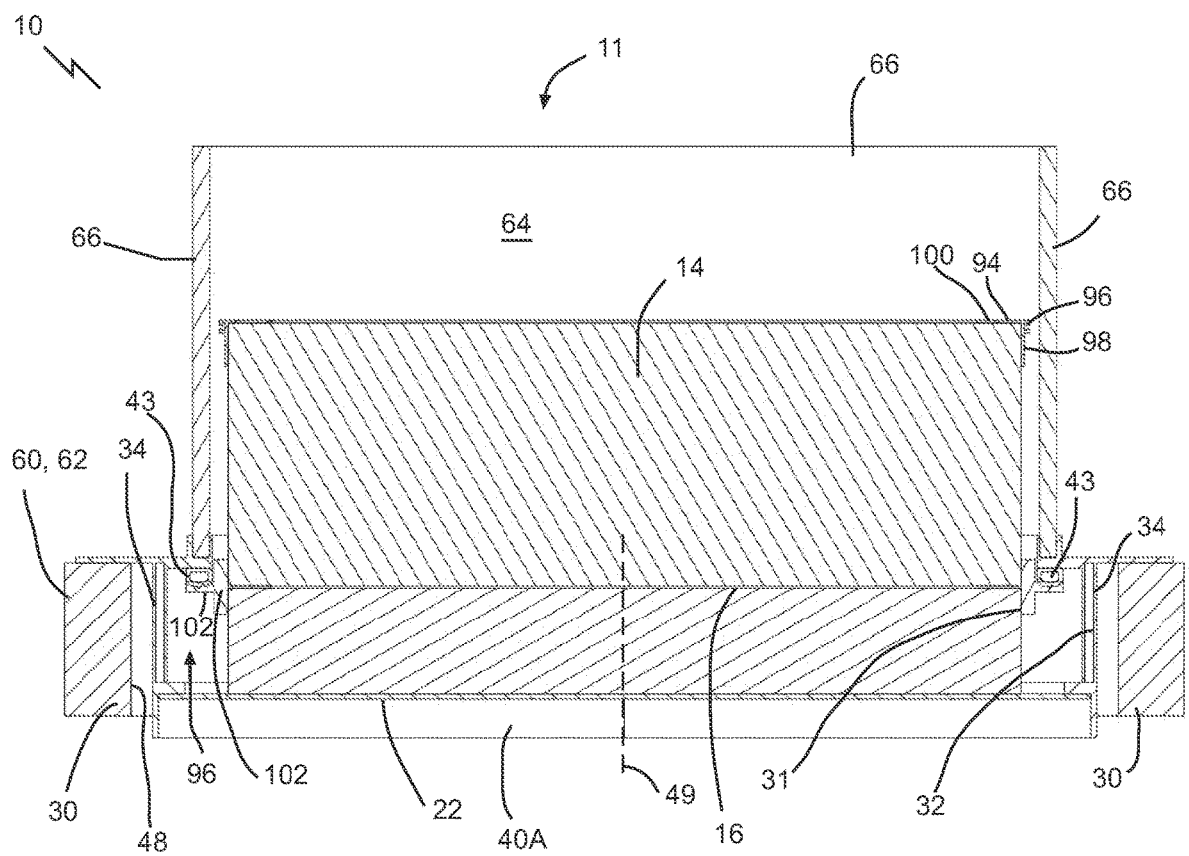
FIG. 18 is a cross-sectional view of the attic hatch system of FIG. 16.

Referring to FIGS. 16-18, a related but different embodiment of hatch system 10 is illustrated, with the gasket 43 moved to engage a base surface of a radially-inward flange 37, which in the example extends radially inward flush with top flange 36, with the collar 102 mounted between parts 14A and 14B of hatch body 14. FIG. 16 illustrates the locking part 24 in a locked and closed position, whereas FIG. 17 illustrates the locking part 24 in an unlocked and open position. When in the open position, the locking part 24 swings the latch 76 radially inward and out of clearance of the base flange member 40, to permit the attic hatch 11, for example hatch body 14 and door part 22, to be axially slid out of the attic hatch system 10 to enable access to the attic.

Referring to FIGS. 1-3, the system 10 and/or ceiling 30 may comprise other suitable features, such as insulative material 18, some examples of which include insulation boards, batt blankets, loose fill or blown in insulation, or spray foam. In the examples shown, such insulation may be applied within respective cavities defined between adjacent spaced structural members 20. Such insulation may also extend above the cavities, forming a thermal break layer atop the top shoulders 42 of the members 20.

Rigid insulation boards may be made from dense sheets of closed-cell foam, which may be made of polyisocyanurate or polyiso, extruded polystyrene (XPS), and expanded polystyrene (EPS). Polyiso foam insulation typically comes with a foil facing that serves as a radiant barrier, with R-values at about R6.5 to R-6.8 per inch. XPS foam, such as Styrofoam, is usually blue or pink in color and has a plastic surface which is an effective insulative material. The plastic surface may be flammable and may deteriorate over time with sun exposure, which is an important feature to consider. The XPS foam has an R-value at about R-5 per inch. EPS foam is an inexpensive alternative to the XPS foam, but with a lower R-value of R-38 per inch due to surrounding voids.

Batt blanket insulation may be used to insulate attics, ceilings, and walls. Rolls of blanket insulation are typically made of plastic fibers or natural fibers. Batt insulation made of fiberglass is a common example of a plastic fiber, and is an inexpensive insulation material with R values of R-2.9 to R-3.8 per inch. Mineral wool is an example of a natural fiber made from stone wool and typically has 30% higher R-value than fiberglass. Mineral wool has higher density, is hydrophobic, and is fire resistant, which makes it a superior insulation material, but it tends to be more expensive than fiberglass. Overall, batt blanket insulation is an easy way to install insulation because batts may be manufactured and pre-cut or cut on-site in various sizes to fit between most ceiling joists and rafters.

Loose-fill or blown-in insulation is another type of attic and ceiling insulation. Such insulation may be available with either fiberglass or cellulose materials. This type of insulation may be blown into hard-to-reach areas using a long flexible tube. Small particles of fiberglass, or other materials, form the insulative material that conforms to any space without disturbing structures or finishes. Blown-in fiberglass is fire resistant, but decreases its R-value in cold climates due to the extreme difference in temperatures between the interior and exterior of the house, and air gaps between particles, or due to uneven settling of post-installation movement of particles. Cellulose insulation is more durable than fiberglass because it retains its R-value of about R-3.2 to R3.8 in extreme temperatures, but may be flammable.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privilege is claimed are defined as follows:

1. An attic hatch system for mounting within an attic access conduit defined by a ceiling, the attic hatch system comprising:
   an attic hatch structured to mount within the attic access conduit, the attic hatch comprising an insulative hatch body;
   one or more hanger parts structured to support the attic hatch within the attic access conduit in use, with each of the one or more hanger parts comprising:
      a top flange member extended laterally outward from the insulative hatch body to extend over and secure on a top shoulder of a structural member of the ceiling in use;
      a skirt structured to depend from the top flange member through the attic access conduit in use; and
      a base flange member structured to extend laterally inward to define a seat; and
   a locking part that is structured to reversibly lock and unlock the attic hatch in a closed position, in which the locking part is structured to form a base surface of the attic hatch that is supported by the seat of the base flange member when in the closed position.

2. The attic hatch system of claim 1 in which:
   the skirt or skirts of the one or more hanger parts form a peripheral skirt that is structured to line an interior wall of the attic access conduit in use;
   the top flange member or top flange members of the one or more hanger parts form a peripheral top flange member around the peripheral skirt; and
   the base flange member or base flange members of the one or more hanger parts form a peripheral base flange member around the peripheral skirt.

3. The attic hatch system of claim 2 in which the one or more hanger parts comprise four or more hanger parts mounted about the attic access conduit with each hanger part forming a side wall structured to line an adjacent respective side wall of four side walls, of the ceiling, that define the attic access conduit in use.

4. The attic hatch system of claim 1 in which the top flange member, skirt, and base flange member, of each of the one or more hanger parts, are formed of sheet parts.

5. The attic hatch system of claim 1 in which:
   the attic hatch comprises a door panel; and
   the door panel is mounted adjacent or facing a floor-facing end of the insulative hatch body.

6. The attic hatch system of claim 5 in which the door panel defines the base surface, of the attic hatch, that rests upon the seat.

7. The attic hatch system of claim 6 in which the door panel is mounted adjacent a floor-facing end of the base flange member of the one or more hanger parts.

8. The attic hatch system of claim 7 in which the door panel is mounted to hinge relative to the skirt, between an open position and a closed position.

9. The attic hatch system of claim 8 in which the door panel is configured to move between the closed position and open position by sliding along an attic access conduit axis defined by the skirt, and swinging relatively to the skirt.

10. The attic hatch system of claim 1 in which the locking part is configured to compress a gasket, of the attic hatch system, oriented to seal one or more of a periphery of the attic access conduit, or a periphery between the one or more hanger parts and the attic hatch, in use when in the closed position.

11. The attic hatch system of claim 1 in which the one or more hanger parts comprise a riser extended above the top flange member.

12. The attic hatch system of claim 11 in which one or more of:
   the riser comprises a material that has a lower heat conductivity than the skirt;
   the riser comprises insulative plastic or foam; and
   the insulative hatch body extends along and within the skirt and the riser.

13. The attic hatch system of claim 11 in which the attic hatch and one or both of the one or more hanger parts and the riser define a non-convective air gap therebetween, with a peripheral seal sealing therebetween.

14. The attic hatch system of claim 1 further comprising the ceiling, with the one or more hanger parts supporting the attic hatch within the attic access conduit.

15. The attic hatch system of claim 14 further comprising, for each of the one or more hanger parts, one or more fasteners securing the top flange member to the top shoulder of the structural member.

16. The attic hatch system of claim 14 in which:
the attic access conduit has four side walls; and
the skirt or skirts of the one or more hanger parts form a peripheral skirt that lines interior surfaces of the attic access conduit in use.

17. The attic hatch system of claim 16:
in which the skirt or skirts of the one or more hanger parts are spaced from the interior surfaces of the attic access conduit to define an annular cavity between the interior surfaces of the attic access conduit and an exterior wall of the skirt or skirts; and
further comprising a peripheral insulative collar filling the annular cavity.

18. The attic hatch system of claim 17 in which the peripheral insulative collar is formed by a two-part expanding foam system.

19. The attic hatch system of claim 14 in which the top shoulders are defined by ceiling joists as the structural members.

20. A method comprising:
installing one or more hanger parts about an attic access conduit defined within a ceiling, by securing a top flange member or top flange members of the one or more hanger parts to a top shoulder or top shoulders of a structural member or structural members, respectively, of the ceiling; such that:
the top flange member extends laterally outward from the attic access conduit over the top shoulder;
a skirt of the one or more hanger parts depends from the top flange member through the attic access conduit; and
a base flange member of the skirt extends laterally inward from the skirt to define a hatch seat;
mounting an attic hatch within the attic access conduit, the attic hatch comprising an insulative hatch body; and
locking the attic hatch in a closed position using a locking part, in which the locking part forms a base surface that is supported by the hatch seat of the base flange member when in the closed position.

21. An attic hatch system comprising:
an attic hatch mounted within an attic access conduit defined by a ceiling, the attic hatch comprising an insulative hatch body;
one or more hanger parts supporting the attic hatch within the attic access conduit, with each of the one or more hanger parts comprising:
a top flange member extended laterally outward from the insulative hatch body to extend over and secure on a top shoulder of a structural member of the ceiling;
a skirt that depends from the top flange member through the attic access conduit; and
a base flange member that extends laterally inward to define a seat that supports a base surface of the attic hatch;
in which:
the attic access conduit has four side walls;
the skirt or skirts of the one or more hanger parts form a peripheral skirt that lines interior surfaces of the attic access conduit in use;
the skirt or skirts of the one or more hanger parts are spaced from the interior surfaces of the attic access conduit to define an annular cavity between the interior surfaces of the attic access conduit and an exterior wall of the skirt or skirts; and
a peripheral insulative collar fills the annular cavity.

* * * * *